US012781837B2

(12) United States Patent
Bieito Ochoa

(10) Patent No.: US 12,781,837 B2
(45) Date of Patent: Nov. 3, 2026

(54) ELECTROMECHANICAL ACTUATOR

(71) Applicant: Oliver Bieito Ochoa, Gasteiz (ES)

(72) Inventor: Oliver Bieito Ochoa, Gasteiz (ES)

( * ) Notice: Subject to any disclaimer, the term of this patent is extended or adjusted under 35 U.S.C. 154(b) by 0 days.

(21) Appl. No.: 19/111,223

(22) PCT Filed: Sep. 4, 2023

(86) PCT No.: PCT/ES2023/070537
§ 371 (c)(1),
(2) Date: Mar. 12, 2025

(87) PCT Pub. No.: WO2024/056924
PCT Pub. Date: Mar. 21, 2024

(65) Prior Publication Data

US 2026/0085746 A1 Mar. 26, 2026

(30) Foreign Application Priority Data

Sep. 16, 2022 (ES) .................................. 202230807

(51) Int. Cl.
*F16H 25/24* (2006.01)
*F16H 25/20* (2006.01)

(52) U.S. Cl.
CPC . *F16H 25/2454* (2013.01); *F16H 2025/2037* (2013.01); *F16H 2025/204* (2013.01);
(Continued)

(58) Field of Classification Search
CPC ......... F16H 25/2454; F16H 2025/2037; F16H 2025/204; F16H 2025/2075;
(Continued)

(56) References Cited

U.S. PATENT DOCUMENTS 3,307,663 A 3/1967 Luenberger
4,500,805 A * 2/1985 Swanson .................. H02K 7/06
310/83
(Continued)

FOREIGN PATENT DOCUMENTS

CN 206816770 U 12/2017
CN 207333609 U * 5/2018
(Continued)

OTHER PUBLICATIONS

Translation of International Search Report for International Application No. PCT/ES2023/070537, Mailed on Aug. 11, 2023.

*Primary Examiner* — Zakaria Elahmadi
(74) *Attorney, Agent, or Firm* — Notaro, Michalos & Zaccaria P.C.

(57) ABSTRACT

A device formed by a spindle is connected to a nut and to one or more servo motors where the transmitted torque will be the sum of the separate torques of the servo motors. The device has a set of two or more rods arranged around the spindle. The spindle is supported in two bearing housings that restrict axial movement in both directions, including an anti-reverse system that only allows a drive shaft to rotate, all inside an inner sleeve. An outer sleeve moves along the outside of the inner sleeve under a fixed metal structure for securing to a machine, keeping all particle entry units closed. Four screwed elements allow the spindle to be put into a parked position to facilitating replacement of wear units.

14 Claims, 7 Drawing Sheets

(52) U.S. Cl.
CPC ................ *F16H 2025/2075* (2013.01); *F16H 2025/2463* (2013.01)

(58) Field of Classification Search
CPC ............. F16H 2025/2463; F16H 25/20; F16H 57/0497; F16H 25/24; F16H 25/2018
See application file for complete search history.

(56) References Cited

U.S. PATENT DOCUMENTS

| | | | | |
|---|---|---|---|---|
| 8,358,096 | B2 * | 1/2013 | Bastholm | F16H 25/2015 74/89.37 |
| 2009/0260464 | A1 * | 10/2009 | Holker | F16H 57/0497 74/89.44 |
| 2010/0186529 | A1 * | 7/2010 | Chiang | F16H 25/2015 74/89.37 |
| 2015/0007677 | A1 * | 1/2015 | Jacob | F16H 25/20 74/89.44 |
| 2020/0056689 | A1 * | 2/2020 | Lawlor | F16N 11/08 |

FOREIGN PATENT DOCUMENTS

| | | | |
|---|---|---|---|
| CN | 109185410 | A | 1/2019 |
| CN | 209267353 | U | 8/2019 |
| DE | 3444946 | A1 | 6/1986 |
| JP | 2017067197 | A | 4/2017 |

* cited by examiner

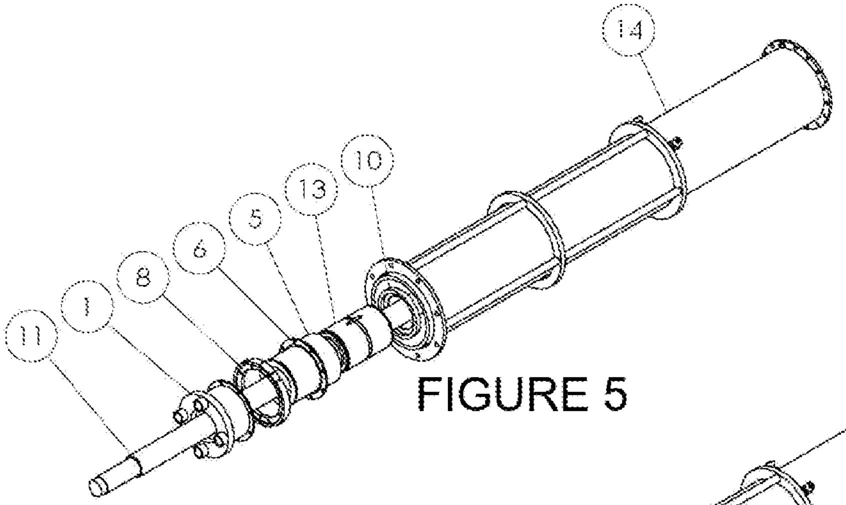
FIGURE 5
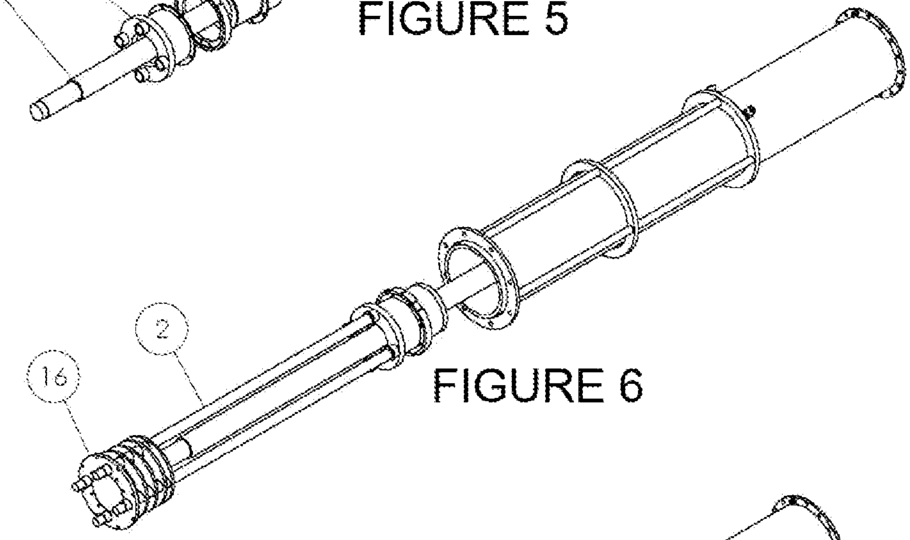
FIGURE 6
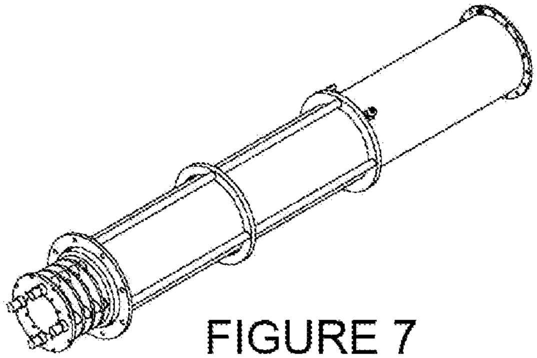
FIGURE 7
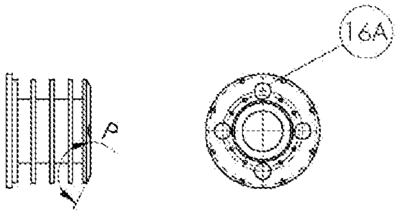
FIGURE 7.1

CROSS SECTION M-M

DETAIL R

DETAIL S

ELECTROMECHANICAL ACTUATOR

TECHNICAL FIELD

The present invention falls within the framework of high performance electromechanical actuators subjected to forces over 600 KN and with strokes greater than 1500 mm.

Its main industrial application, although not the only one, would be in the recycling and forage baler sector, both horizontal and double compression balers.

The object of the invention is to provide an electromechanical actuator with a design capable of withstanding high loads, movements and the harsh working conditions required by the industrial applications for which it has been conceived, without incurring too large or costly elements, presenting greater rigidity than other existing mechanisms and therefore greater capacity, reducing the useful cross section of the rods and lightening the system, all with a structure that extends the useful life of the device and minimises its maintenance, being better protected/insulated against dirt.

BACKGROUND OF THE INVENTION

In the field of practical application of the invention, which is actuators designed for heavy loads, multiple inventions relating to electromechanical actuators or mechanisms associated with them are known.

The closest prior art is U.S. Pat. No. 4,500,805 for an electromechanical actuator for heavy loads, which, although it shares certain structural features with the device of the present invention, has a series of limitations and problems.

In this sense, the device described in U.S. Pat. No. 4,500,805 consists of a set of four rods arranged circumferentially and joined at both ends by means of fastening screws, which limits the movements and the maximum loads withstood due to the increase in the buckling length.

This device has two housings for bearings at the front and rear portion, consisting of angular ball bearings arranged in line and connected back to back. This design presents an important limitation in the life of the elements, as well as in the load to be withstood.

In accordance with another of the problems with this device, the device involves four rods arranged circumferentially with a single locking element with four axial openings to allow the rods to pass through. This arrangement is problematic mainly in dirty environments where the amount of dust and particles can enter through the openings, causing a problem in the spindle or reducing the life of the bearings.

In parallel, irreversibility systems for electromechanical actuators are known, such as the one described in the German patent DE3444946A1, which consists of an irreversibility system actuated by a helical spring connected to two pads at the ends arranged with slots such that they engage with little clearance in a key positioned on the shaft of the side of the spindle.

Although this system satisfactorily fulfils the function for which it was designed, the very configuration of the helical spring means that the system has a volume that would be desirable to reduce, as well as a structure with a complex installation that would be desirable to simplify.

DESCRIPTION OF THE INVENTION

The electromechanical actuator of the invention solves in a fully satisfactory manner the above-mentioned problem in each and every one of the aspects mentioned.

The solution intends to replace the entire hydraulic technology of both continuous and double box, double compression balers, etc., in both the recycling and agricultural sectors, without ruling out other areas where similar performance is required.

More specifically, the invention dramatically increases the specifications of electromechanical actuators above the threshold of 600 KN and 1500 mm stroke, creating new applications in industry, reducing design and engineering time, enjoying the advantages of electromechanics such as energy savings and rapid return on investment.

For this purpose, the device of the invention is made up of a spindle, a planetary roller nut, an irreversibility system, one or more servo motors coupled directly to the spindle or through a mechanical transmission or various mechanical elements such that the input torque to the spindle is the sum of the torques supplied by each servo motor individually, which assembly is encapsulated in a cylindrical tube or inner sleeve.

The front section of the planetary roller nut, in the direction of load thrust, is connected to a thrust connector which may be cylindrical, and may have two or more cylindrical tubes, arranged around the spindle, with threaded inner walls to receive two or more threaded end rods, and which at the other end thereof thread into a load-distributing pad, which are connected by a flange to the cap of an outer sleeve with a diameter larger than that of the aforementioned inner sleeve, such that this outer sleeve slides forwards and backwards according to the movements of the nut, covering all the entry paths for material from the outside. Lastly, the anchoring means for anchoring the mass to be moved are attached by any conventional means to the cap of the outer sleeve; said anchoring means for anchoring may take different forms depending on the anchoring requirements of the mass to be moved.

A tubular structure is fastened to the inner sleeve by means of a flange, which tubular structure includes fastening means for fastening to different parts of the machine that adopt the shapes required by the machine.

Returning to the nut, it is housed in the cylindrical closure casing, which has an internal geometry complementary to the external geometry of the nut to prevent the nut from rotating inside the closure casing. With regards to the closure casing, it has a flange in the central outer area thereof to attaching it to the thrust connector by means of the flange, providing a circular guide in the middle. Lastly, the assembly formed by the aforementioned elements is closed by means of a closure cap screwed or attached to the closure casing by any conventional means, making relative movement between the elements that form this assembly impossible.

Two bearing housings are provided in alignment with the ends of the spindle, a front housing consisting of the tubular body of a centering piece containing two or more axial roller bearings or similar bearings arranged in opposition to the pressing movement load, each contained in individual housings which in turn engage in the tubular body of the centering piece arranged around the spindle, from which two or more outer discs emerge externally, enabling part of the loads withstood by the axial bearings to be distributed to the inner sleeve, with two or more openings equipped with linear bearings for the passage and guidance of the rods parallel to the spindle. The bearings and individual housings are connected to each other by connectors, such that axial movement in the direction of load movements restricted, by means of lock washers and a front closure cap. The centering piece has fastening means for fastening to the inner sleeve, such that the rods passing through the centering piece cannot rotate about the axis spindle, which restricts the rotation of the planetary nut connected to the thrust connector.

The inside of the front housing is kept completely leak-tight by seals placed on the front and rear openings thereof.

The rear housing consists of an outer rear housing formed by a tubular body equipped with two or more outer discs that allow part of the loads withstood by the axial bearings to be distributed to the inner sleeve, the rearmost disc of which is larger in diameter than the rest and has holes in its outer perimeter for fastening to a flange of the inner sleeve, through which the greater part of the load distributed by the axial bearings is transmitted to the inner sleeve. The tubular body of the outer rear housing in turn houses the irreversibility system and an inner rear housing for axial bearings having a tubular structure with an inner circular rib acting as a spacer between at least one axial bearing arranged in opposition to the pressing movement load located in the front section of the inner rear housing, if it contains more than one axial bearing these are in turn individually contained in individual housings connected to each other by connectors, and at least one axial bearing in the rear section thereof arranged in opposition to the retraction movement load, if it contains more than one axial bearing these are in turn individually contained in individual housings connected to each other by connectors. The outer rear housing is sealed by seals located in the front and rear openings of said housing.

This arrangement and structure of the rods, front and rear housings, axial bearings, thrust connector and load distribution flanges allows the load capacity and stroke of the actuator to be extended, and the absorption of buckling loads of the rods with smaller diameters to be improved, thus reducing costs and lightening the solution.

The device has an irreversibility system containing a drive shaft with two keys connected to a driven shaft (extension of the spindle) and a C-shaped spring, with a certain preload in a resting state with a trigger attached to each end encapsulated in a cylinder of revolution and retained by a locking washer, the cylinder of revolution being limited in rotation and movement by means of a cap with a protrusion with a geometry that engages with and is complementary to that of the cylinder of revolution. The C-shaped spring couples on the drive shaft such that the plates of the cylinder of revolution come into contact with the triggers, which in turn must engage with the keys of the driven shaft. Based on this structure, the mechanism allows movement in both directions if the movement is initiated on the drive shaft when the preload of the spring is reduced and locks the system if the movement is initiated on the driven shaft when the load of the preloaded spring is increased.

The use of a C-shaped spring, compared to a helical spring, makes it possible, on the one hand, to establish in the same plane the activation mechanisms for activating the irreversibility system of the movement coming from the driven shaft, regardless of whether the movement is clockwise or counter-clockwise, reducing the length of the element of revolution where the irreversibility system is housed, simplifying the structure of the system and its installation, which results in a reduction of the total length of the actuator. On the other hand, the larger friction surface of the C-shaped spring and the specific structure of the system increase the resistance to the reversing movement to the point at which the actuator will collapse before allowing the reversal of the movement of the spindle.

According to another of the features or advantages of the invention, the inner sleeve has four elements screwed thereto, with adjustment nuts and sealing O-rings, having for this purpose four or more threaded boreholes for the implementation of the screwed elements, such that they align with the intended guide connected to the planetary nut, in the so-called parking position, allowing the replacement of spare parts, or the operating position with the screwed elements tangential to the inner diameter of the inner sleeve and the adjustment nuts, sealing the system, for normal operation.

As for the load distribution pads associated with the opposite ends of the rods that are connected to the planetary nut that moves the spindle through the thrust connector, they consist of an internally threaded cylindrical tube rigidly connected to a load distribution flange, which is fastened to the cap of the outer sleeve at the free end of the actuator, restricting the relative movement of the outer sleeve with respect to the rods.

As for the rods involved in the device, they are connected together at the end thereof opposite the planetary nut by means of the load distribution pad fastened to the cap of the outer sleeve and the two or more outer discs of the centering piece, such that the last or rearmost of said discs defines a contact surface with the inner sleeve, having an angled chamfer, and the first or foremost of said discs has a larger diameter than the rest, with holes in its outer perimeter for fastening to a flange arranged on the inner casing. It is this first outer disc that transmits most of the load transmitted by the axial bearings to the individual housings and from the individual housings to the centering piece through the fastening flange to the inner sleeve.

Lastly, as mentioned above, the actuator can be assisted by two servo motors connected to a gear transmission of any type, such that the torque transmitted to the spindle is the sum of the torques transmitted by each servo motor individually, as well as being connected in "load sharing" mode, sharing loads on demand.

It only remains to be noted that the tube forming the inner sleeve may have any cross-section, either circular as described above or square, rectangular, oval, etc. Consequently, all the elements which can be fitted to the inner sleeve must have a shape or cross-section corresponding to that of the inner sleeve.

DESCRIPTION OF THE DRAWINGS

As a complement to the description that will be provided herein, and for the purpose of helping to make the features of the invention more readily understandable, according to a preferred practical exemplary embodiment thereof, said description is accompanied by a set of drawings constituting an integral part thereof in which, by way of illustration and not limitation, the following is represented.

DETAIL-N shows an isometric cross section of the front bearing housing of the device of the invention.

DETAIL-O shows an isometric cross section of the rear bearing housing of the device of the invention.

Figure 1:
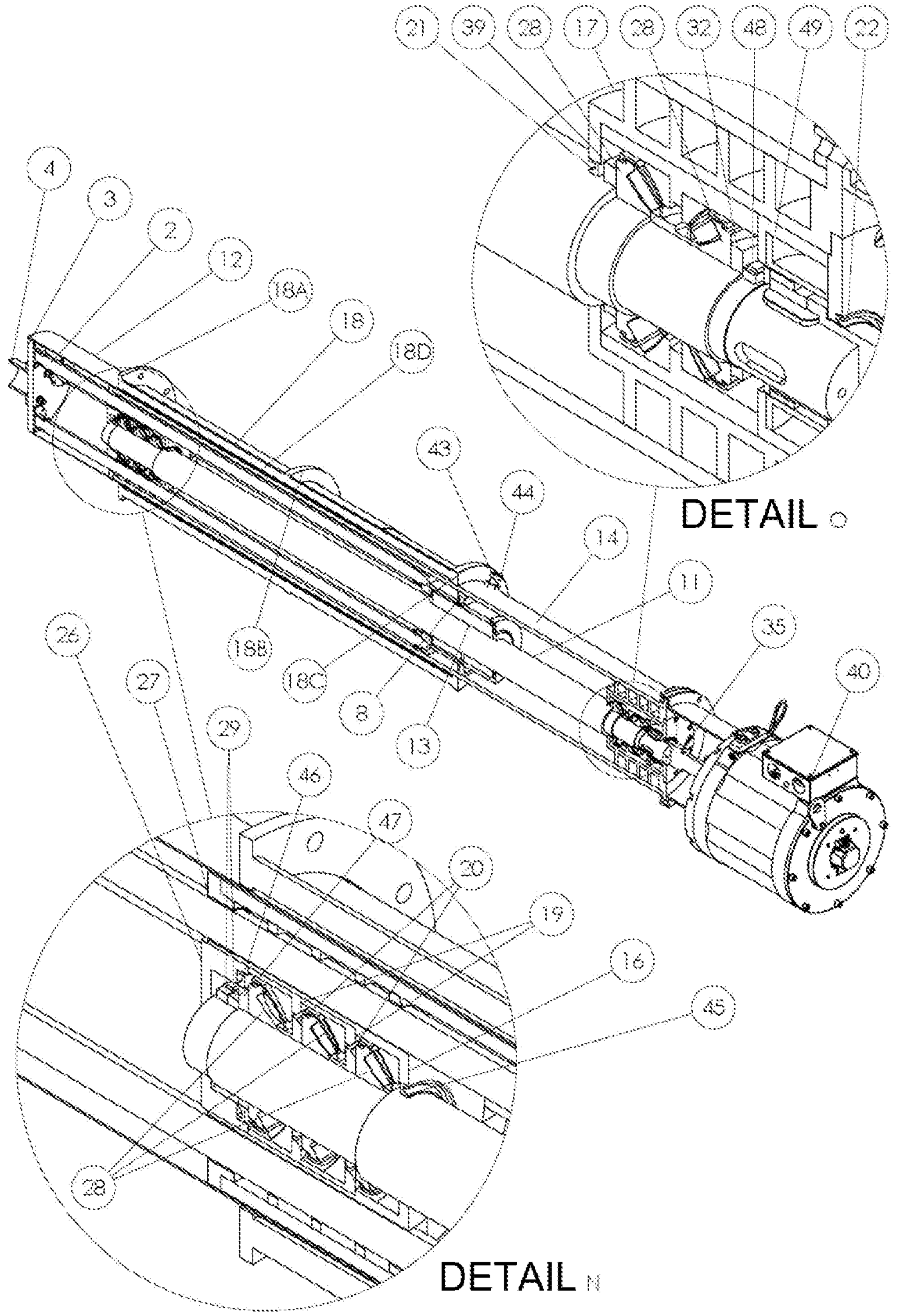
FIG. 1 shows a cross-sectional view of the device of the invention according to an embodiment variant in which the device has a configuration with a single servo motor connected by direct coupling and the enlarged detail views N and O.
Figure 2:
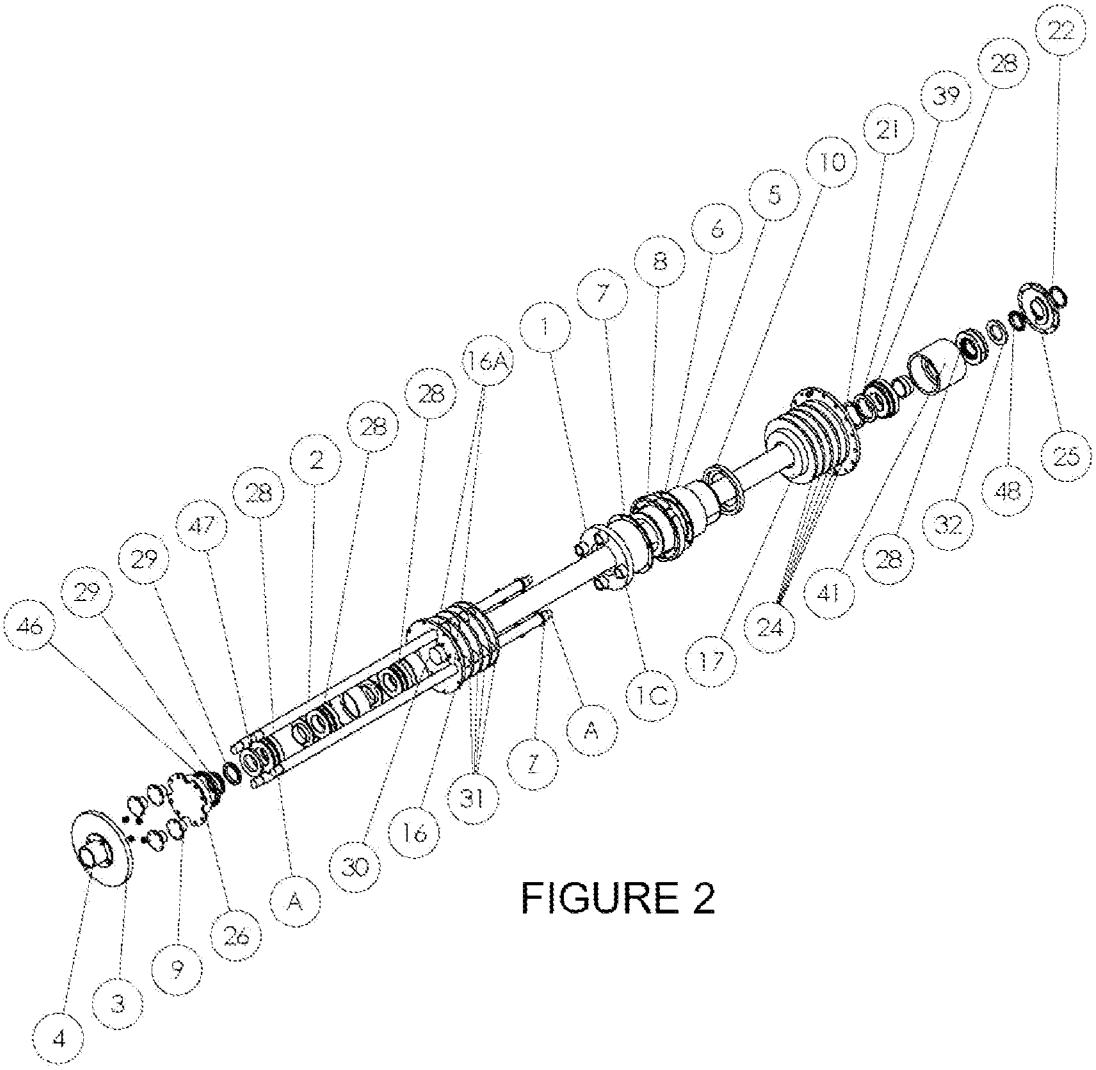

FIG. 2 shows an isometric perspective exploded view of the internal components of the device of the invention and the connection therebetween.

Figure 3:
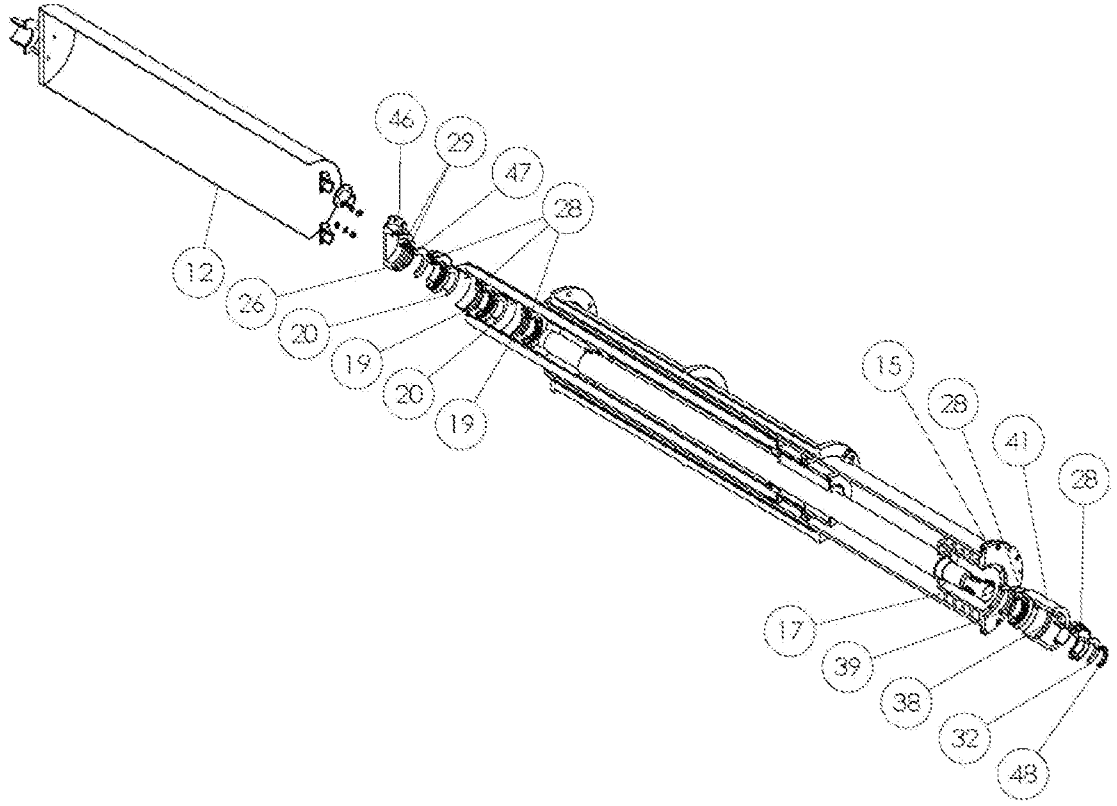

FIG. 3 shows an isometric perspective cross section of the disassembly of the bearing housings shown in the detail views N and O.

Figure 4:
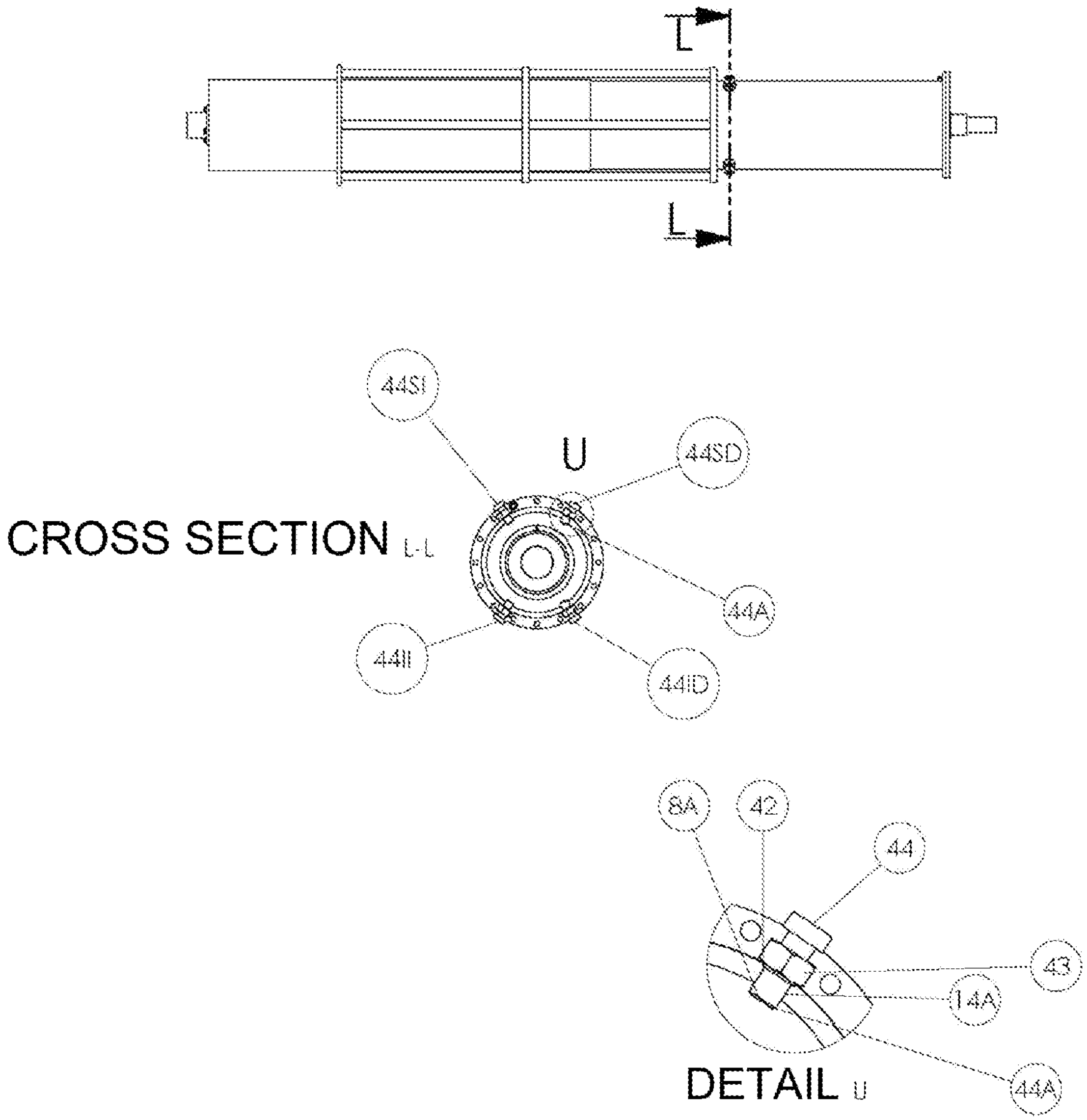

FIG. 4 shows the side view of the device of the invention without propulsion means represented and in order to locate the cross section L-L and the enlarged detail view U of the cross section L-L.

CROSS SECTION L-L shows a cross section of the "parking position" by means of the location plan of the screwed connections.

DETAIL-U shows an enlarged detail view of the L-L cross section at the level of one of the screwed connections.

FIG. 5 shows an isometric view of the removal of the spindle and nut as support material for the explanation of the replacement of the spindle-nut.

FIG. 6 shows an isometric view of the assembly of the new spindle and nut with the two or more rods, prior to insertion into the closure sleeve.

FIG. 7 shows an isometric view of the method described in the specification of the centering of the spindle and nut through the screwed units.

FIG. 7.1 shows respective detail views in profile and front elevation of the assembly shown in FIG. 7 at the free end of the spindle.

Figure 8:
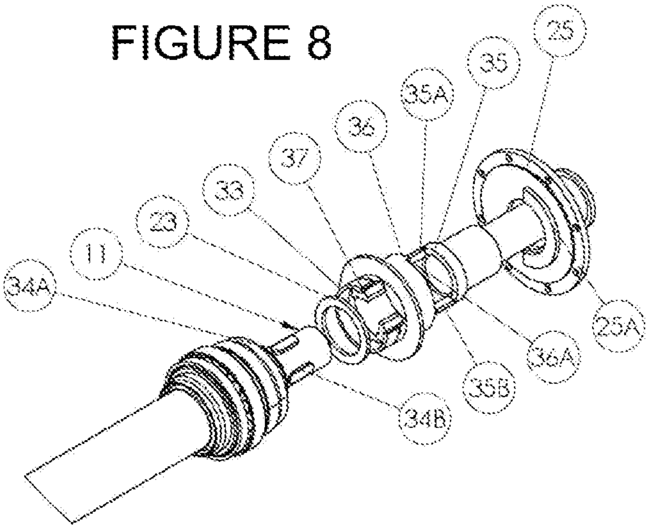

FIG. 8 shows an exploded view of the elements that make up the movement irreversibility system.

Figure 9:
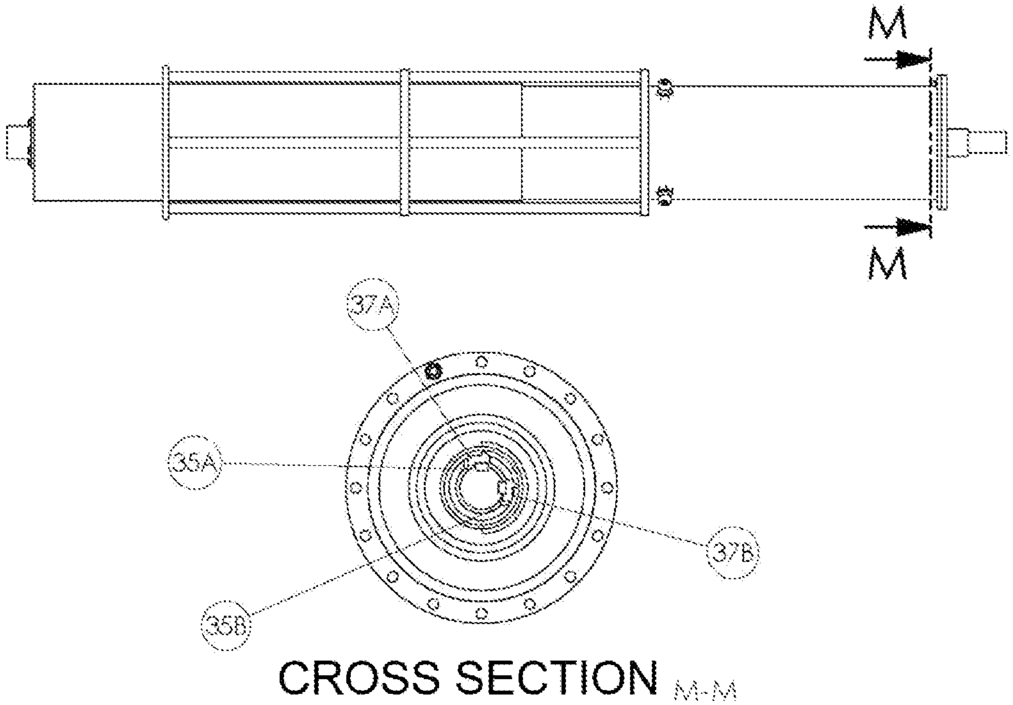

FIG. 9 shows a side view of the device of the invention necessary to locate the M-M cross section.

CROSS SECTION M-M shows a cross section of the irreversible system.

Figure 10:
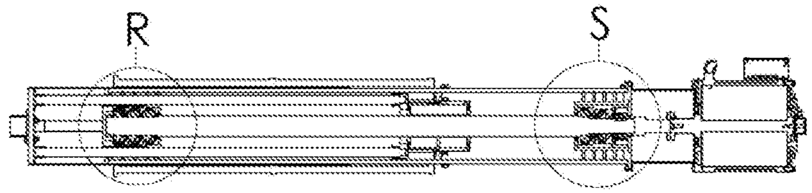
Figure 10:
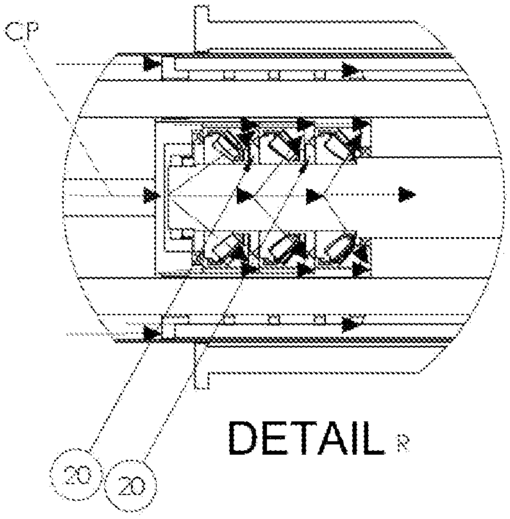
Figure 10:
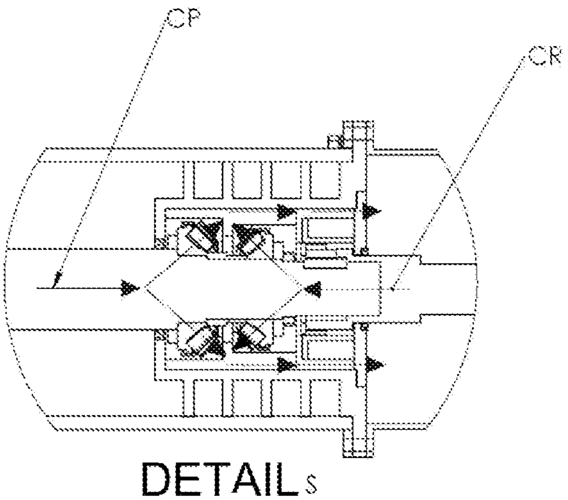

FIG. 10 shows a diameter cross section of the device, for positioning the R and S detail views.

DETAIL R shows the stress distribution through the axial bearings in the front housing.

DETAIL S shows the stress distribution through the axial bearings in the rear housing.

PREFERRED EMBODIMENT OF THE INVENTION

In light of the figures shown, it can be seen that the device of the invention comprises a spindle (11), connected to a planetary roller nut (13), balls or similar, which spindle is actuated by at least one servo motor (40), connected through direct coupling or a chain transmission where in the case of two drive units both are connected on the same shaft or different shafts, if they are mechanically attached in order for the torque transmitted to the spindle to be the sum of the torques generated by each servo motor (solution not shown in the drawings).

The servo motor (40) actuates the spindle (11) connected to the nut (13), the turning of which is restricted by means that will be presented below, such that it moves longitudinally on the axial shaft in both directions and the whole assembly is encapsulated and enclosed in all directions by an inner sleeve (14), a front cap (26) and a rear cap (25).

The spindle (11) is supported at both ends by two housings for bearings, front and rear, shown in DETAIL-N, DETAIL-R and DETAIL-O, DETAIL-S.

The front housing that withstands the highest axial loads in the opposite direction to the pressing movement consists of the tubular body (30) of a centering piece (16) containing two or more axial roller bearings (28) the same or different according to the specific design criteria of each case, arranged in opposition to the pressing movement load, individually contained in individual housings (19) which in turn engage in the tubular body (30) of the centering piece (16) arranged around the spindle (11), from which two or more outer discs (31) emerge externally to transmit the loads withstood by the axial bearings (28) to the inner sleeve (14), with two or more openings (16A) for the passage of rods (2) parallel to the spindle, the openings (16A) of the foremost outer disc (31) being equipped with linear bearings (27) for guiding the rods (2). The axial bearings (28) and individual housings (19) are connected to each other by connectors (20), such that axial movement in the direction of load movements restricted, by means of lock washers (29) and a front closure cap (26). The centering piece has fastening means for fastening to the inner sleeve, such that the rods (2) passing through the centering piece (16) cannot rotate about the axis spindle, which restricts the rotation of the nut (13) connected to the thrust connector (1).

The selection of axial bearings and the configuration of their corresponding front and rear housings is not merely a design option, but depends on the type of specific loads withstood by the actuator and the distribution and transmission thereof to the inner sleeve (14). More specifically, the actuator withstands two types of axial stresses in opposite directions to the movement of the actuator, the pressing movement load (CP) and the retraction movement load (CR). Said stresses are transmitted as shown in DETAILS R and S, represented by arrows, in such a way that said loads are transmitted obliquely through the axial bearings (28), arranged in opposition to the axial load to be withstood, towards the area outside those of larger diameter through the geometry of the axial bearing itself, which in turn transmit the load towards surfaces of larger diameter up to the inner sleeve (14) in the following way.

The front housing exclusively receives the pressing movement load (CP) which is transmitted axially through the lock washers (29) and connector (47) to the foremost axial bearings (28) which transmits it obliquely to the corresponding individual housing (19) and to the corresponding connector (20) connected to the next axial bearing. The oblique load transmitted to the individual housing (19) is transmitted by the same to the tubular body (30) and to the next individual housing (19). The oblique load transmitted to the tubular body (30) of the centering piece (16) is transmitted to the inner sleeve (14) through the outer discs (31), while the load transmitted to the connector is transmitted axially to the next axial bearing (28). This load transmission process is repeated systematically until it reaches the rearmost axial bearings (28) of the front housing, which obliquely transmits the axial load withstood directly onto the end section of the tubular body (30) of the centering piece (16), which constitutes the housing of said axial bearing, which in turn transmits them to the inner sleeve (14) through the outer discs (31) and axially through the flange of the inner sleeve connected to the foremost outer discs (31) of the centering piece. Lastly, the inside of the tubular body (30) of the front housing is kept completely leak-tight by the front seal (46) of the front opening and the rear seal (45) of the rear opening.

While the rear housing receives load in both directions (pressing movement load (CP) and retraction movement load (CR)). On the one hand, the retraction movement load (CR) is due solely to friction and friction between pieces and the weight of the mass to be moved, and on the other hand, most of the pressing movement load (CP) has been discharged through the front housing. Therefore, the loads to be withstood by the rear housing, even in two directions, are lower. As a result of this and its position inside the inner sleeve (14), as well as the need to also house the irreversibility system, the configuration of the rear housing is different from that of the front housing.

Specifically, the rear housing consists of an outer rear housing (17) formed by a tubular body, with an integrated front cap, equipped with two or more outer discs (24) that allow part of the loads withstood by the axial bearings (28) to be distributed to the inner sleeve (14), the rearmost disc of which is larger in diameter than the rest and has holes in its outer perimeter for fastening to a flange (15) of the inner sleeve (14) and to the rear cap (25), through which flange the greater part of the load distributed by the axial bearings (28) is transmitted to the inner sleeve (14). The tubular body of the outer rear housing in turn houses the irreversibility system encapsulated in the casing (49) and an inner rear housing (41) for axial bearings having a tubular structure with an inner circular rib (38), constituting a housing at each side of the rib for at least one axial bearing (28) arranged in opposition to the pressing movement load (CP) located in the front section of the inner rear housing (41), if it contains more than one axial bearing (28) these are in turn individually contained in individual housings connected to each other by connectors, and for at least one axial bearing (28) in the rear section thereof arranged in opposition to the retraction movement load (CR), if it contains more than one axial bearing (28) these are in turn individually contained in individual housings connected to each other by connectors. The outer rear housing (17) is sealed at the front portion thereof by a front seal (21) and at the rear portion thereof by a rear sealing cap (25) and a rear seal (22).

Specifically, in the practical embodiment shown in the figures, the pressing movement load (CP) is transmitted, through the connector (39), to the axial bearing (28) of the front section which in turn obliquely transmits the load to the inner rear housing (41) which distributes it in the outer rear housing (17) and the casing (49), which then transmits it to the outer rear housing (17) through the sealing cap (25) preventing the load from affecting the irreversibility system, so that the loads are finally transmitted to the inner sleeve (14) through the outer discs (24) and the flange of the outer rear housing (17). With regards to the retraction movement load (CR), it is transmitted, through the connector (32), to the axial bearing (28) of the rear section, which in turn obliquely transmits the load to the inner rear housing (41), which transmits it to the outer rear housing (17), which transmits it through the outer discs (24) and the flange of the outer rear housing (17) to the inner sleeve (14). Lastly, a lock washer (48) restricts the axial movement of the elements contained in the rear section of the inner rear housing (41), preventing pressing loads (CP) and retraction loads (CR) from affecting the irreversibility system.

Lastly, the residual load is discharged into the machine through the fastening means for fastening the actuator to the machine. Axial bearings can only transmit the load in one direction, hence their position in the design.

The nut (13) is housed in the cylindrical closure casing (5), which has an internal geometry complementary to the external geometry of the nut (13) to prevent the nut (13) from rotating inside the closure casing (5). With regards to the closure casing (5), it has a flange (6) in its outer central area for the attachment thereof to the thrust connector (1) through the flange (7), providing in the middle the guide (8) made of a self-lubricating technical plastic to avoid heating and minimise friction losses, as well as serving to secure the so-called "parking" system that facilitates the maintenance or quick change described below. Lastly, the assembly formed by the aforementioned elements is closed by means of a closure cap (10) screwed or attached to the closure casing (5) by any conventional means, making relative movement between the elements forming this assembly impossible.

The thrust connector (1) is provided with at least two internally threaded tubular housings (1C), where two or more rods (2) are housed, which rods are threaded at both ends and designed such that the loads are distributed over the threads, which may be equipped with an axial movement stop (Z) of the actuator consisting of a machined or welded perimeter ring arranged close to the threaded end (A) that is threaded to the tubular housing (1C) of the thrust connector (1), which in case of abnormal operation abuts against the rearmost outer discs (31) of the centering piece (16). The free ends of each rod pass through the corresponding openings of the outer discs (31) of the centering piece (16) with the limits set by the axial movement stops (Z). The load distribution pads (9) consist of an internally threaded tube rigidly connected to a load distribution flange, such that the free threaded end (A) of each stem threads into the threaded tube of the load distribution pad (9) connected to each rod (2) and the flange of each load distribution pad is screwed to the cap (3) of the outer sleeve at the free end of the actuator, preventing the relative movement of the outer sleeve (14) with respect to the rods, thus rigidly connecting the assembly.

According to one of the features of the invention, the threading on the rods is designed so that loads are distributed on the threads by increasing the contact surface decreases the buckling length, withstanding high loads with smaller diameters. In addition, the rods are guided by the centering piece (16) which, as explained above, has openings arranged circumferentially in the outer discs (31) of the centering piece (16) which exactly align with the position of the rods (2), favouring the transmission of loads to the sleeve (14). These openings serve as housings for linear bearings (27) made of self-lubricating materials with low friction coefficients. This centering piece (16), from this transmission of forces to the sleeve (14) to which it is flanged, makes it possible to significantly reduce the buckling to which the rods (2) may be subjected.

The cap (3) of the outer sleeve (12) allows the whole system to be attached to the mass to be moved by means of the anchoring means for anchoring to the mass (4), said anchoring means may take different forms depending on the anchoring requirements of the mass to be moved.

As mentioned above, solutions of this type fall within the framework of the recycling and forage balers known for the extreme environments in which they work, exposed to corrosive liquids, dust and dirt. In the present invention and as an improvement over the prior art mentioned in the background, two or more rods double or more the chances of unwanted substances being introduced into the system, reducing the life of the various elements that make up the actuator or even causing damage that renders the entire system unusable.

This problem is solved by means of an outer sleeve (12), fastened by any conventional attachment means for attaching to the cap (3) of the outer sleeve, with a larger diameter than the inner sleeve (14), arranged in such a way that it covers all dust and waste entry areas in all positions, due to the fact that it slides on the outside of the inner sleeve (14). At its end it has a flexible rubber lip that adapts to the outside of the inner sleeve (14) preventing the entry of particles by entrainment, covering the only particle entry created by the entry and exit of the axial movement component system formed by the nut (13), the thrust connector (1), rods (2), load distribution pads (9) and the outer sleeve (12) itself.

To allow the system to be anchored to the machine, a support structure (18) is provided, which includes fastening means for fastening to different parts of the machine that adopt the shapes required by the machine, rigidly connected to the inner sleeve (14) by a flange or any other conventional means. Specifically, in the case of this practical embodiment, the support structure (18) is formed by one or more anchoring flanges for anchoring to the machine (18A), one or more stiffening flanges (18B) and one or more anchoring flanges (18C) for anchoring to the inner sleeve (14) at the rear portion of the same allowing the outer sleeve (12) to slide under the anchoring flanges of the machine (18A) and the stiffening flanges (18B). These flanges (18A, 18B and 18C) are attached to each other through various tubular components (18D) arranged circumferentially around the inner sleeve (14) allowing the outer sleeve (12) to pass thereunder.

The design of the support structure (18) could be such that it consists of a second outer sleeve, such that the outer sleeve (12) slides over the inner sleeve (14) and under this second outer sleeve which has a flexible rubber lip that adapts to the outside of the outer sleeve (12), thereby further minimising the possibility of particles entering into the actuator by entrainment.

In accordance with another of the features of the invention, and in order to allow the reuse of a large part of the pieces involved in the actuator at the end of its useful life, four threaded boreholes (14A) have been provided in the inner sleeve (14), represented in CROSS SECTION L-L of FIG. 4, as well as visible in the DETAIL-U, on which four or several screwed connections are screwed, consisting of a screw (44), an adjustment nut (43) and an O-ring (42), a screw (44) on which a contact face (44A) is defined, defining a left upper securing element (44SI), a right upper securing element (44SD), a left lower securing element (44II), and a left lower securing element (44ID) formed by respective screws, nuts and O-rings.

These elements allow two positions: operating position with the surface (44A) tangent to the inner diameter of the inner sleeve (14), with the adjustment nut (43) compressing the O-ring (42) against the outer wall of the inner sleeve (14) to ensure leak-tightness, and parking position, marked by threaded boreholes (14A) wherein the nut (13) moves longitudinally on the spindle up to the position such that the surface (44A) of the screws (44) is in alignment with the surface (8A) of the recesses arranged in the guide (8), wherein the adjustment nut (43) compresses the O-ring (42) to ensure the leak-tightness of the system, such that by rotating the screws (44) clockwise the surface (44A) of the screws (44) presses the surface (8A) of the recesses arranged in the guide (8) locking the actuator in what is referred to as the parking position, as shown in CROSS SECTION L-L of FIG. 4.

The parking position is arranged to provide support as close as possible to the centre of gravity of the system, allowing the spindle (11) to be fastened in a fully centred position such that the axial bearings (28) and any components located in the front and rear bearing housings can be replaced, as shown in FIG. 5.

The present invention also allows a full change of the spindle (11), nut (13) and all the components associated with it in a simple manner. FIG. 6 and FIG. 7 are used to explain the method. To replace the spindle (11) and nut (13), the elements contained in the front and rear housings must first be removed using the method described above. The nut (13) is then released from the "parking position" described above by rotating the screws (44) counter-clockwise to the operating position described above. Once the nut (13) has been released from its support, due to the existing clearance with respect to the inner diameter of the sleeve (14), the nut rests on the inner diameter thereof, through the guide (8), the centre of gravity of the assembly, which allows the complete extraction of the spindle (11), the nut (13) and all the components associated with it by sliding the guide (8) over the inner diameter of the inner sleeve (14).

Once the spindle (11) is free and out of the inner sleeve (14), the thrust connector (1), the guide (8) and the closure casing (5) can be released, to then remove the closure cap (10) and release the nut (13), as shown in FIG. 5. Subsequently, the new spindle (11) and nut (13), as well as the rest of the components associated with the nut (13) to be replaced, said components are reassembled on the new nut (13) to then insert the new spindle (11) in the nut (13) and the nut (13) is moved along the spindle (11) up to a position where the two or more rods (2) can be threaded and the centering piece (16) is positioned such that the spindle passes through the tubular body (30) and the rods through the openings (16A) of the centering piece (16) as shown in FIG. 6. The assembled assembly is then slid towards the rear portion of the inner sleeve (14) over the guide (8) along the inner diameter of the inner sleeve (14) until the threaded boreholes (14A) of the sleeve (14) align with the surfaces (8A) of the guide (8). In this position, the nut (13) is centred and resting on the inner walls of the sleeve (14) so the screws (44) are rotated clockwise until the parking position where the spindle nut assembly is centred, the centering piece is slid through the rods up to its corresponding fastening flange for fastening to the inner sleeve (14) and it is screwed thereto. When this occurs, the system is considered centred and in balance, such that the rest of the elements are inserted until completing the front and rear housings as shown in FIG. 3.

With regards to the irreversibility system, due to the low friction of the planetary roller system combined with the size of the passage, this makes it possible to transmit movement from the side of the spindle to the side of the motors. As a solution to this problem, a system described in FIG. 8 is proposed, consisting of a pre-loaded C-shaped spring (33), there being attached to the same a Z-shaped trigger system (37) or having another equivalent geometry, a spindle (11) (driven shaft), with two keys arranged at an angle of 90° or other, therebetween, which in turn coincides with the angle of the triggers (37) attached to the preloaded spring, having a drive shaft with two screwed or welded plates (35A and 35B) arranged at an angle of 90° or other, such that it coincides with the angle of the triggers of the spring and the position of the keys. The system has a locking washer (23) and an element of revolution (36) where the spring is encapsulated, as well as a closure cap with a relief (25A) with a geometry that engages in the cut (36A) to prevent the rotation of the element of revolution (36).

The driven shaft (11) is connected to the driven shaft (35) by adjustment means for adjustment between two moving pieces to be adjusted. With regards to the spring (33), it is inserted into the element of revolution (36) with a preload set such that it is applying a force on the inner diameter thereof. The triggers (37) are arranged such that they align with the plates (35A and 35B) on the outer face thereof and the triggers (37A and 37B) align with the keys (34A and 34B) of the spindle (11) or driven shaft according to the CROSS SECTION M-M of FIG. 9.

The assembly is axially restricted in the direction of the drive shaft. More specifically, the washer (23) prevents the spring from leaving in the direction of the driven shaft. The cap (25) closes the assembly and holds it in position, preventing the rotation of the element of revolution (36) through the relief (25A) that engages perfectly in the cut (36A).

The preloaded spring (33) presses the walls of the element of revolution (36) such that the system is locked if there is no movement from the drive shaft.

If the motor is stopped and the system attempts to rotate both clockwise and counterclockwise, the keys (34A or 34B) push the triggers (37A or 37B) according to the direction of rotation, such that the spring (33) rotates in the direction of preload, increasing the pressure on the walls of the element of revolution (36), locking the system.

The greater the torque when the engine is stopped, the greater the locking force of the system.

Moreover, if the movement comes from the motor in a clockwise or counter-clockwise direction, the drive shaft pushes the triggers (37A or 37B) by means of the plates (35A and 35B), these in turn push the keys (34A or 34B), pulling the driven shaft and rotating the spring (33) in the opposite direction to the preload, decreasing its length such that there is no pressure on the walls of the revolution element (36), allowing the system to rotate.

Since the elements or triggers (37) on which the ends of the C-shaped spring (33) act are in the same plane, this saves space in the axial direction compared to other mechanisms such as the one described in German patent DE3444946A1, a configuration which also makes it easier to assemble the mechanism.

The invention claimed is:

1. An electromechanical actuator, comprising an assembly formed from a spindle (11) connected to a nut (13), actuated by one or more servo motors (40), the nut (13) to which two or more rods (2) are rigidly connected that determine the extensible arm of the actuator, the assembly being encapsulated in an inner sleeve (14), wherein:

a) on the front face of the nut (13), in the direction of the thrust of the load, a thrust connector (1) is connected around the spindle (11) equipped with internally threaded tubular housings (1C) into which one of the threaded ends (A) of the two or more rods (2) threads, while at their opposite threaded ends (A) they thread into load distribution pads (9) attached together by flanges to a cap (3) of an outer sleeve (12), with a larger diameter than the inner sleeve (14), the inner sleeve being complemented by a fastening structure (18) for fastening the actuator to a machine;

b) the electromechanical actuator includes respective end housings containing two or more axial bearings (28), one of which is formed by a tubular body (30) of a centering piece (16) arranged around the spindle (11), where two or more linear bearings (27) are housed, which serve to guide the two or more rods (2) that pass therethrough, including fastening means for fastening to the inner sleeve (14), preventing the rotation of the thrust connector (1), the cap (3), and the outer sleeve (12), and having sealing means;

c) the electromechanical actuator includes an irreversibility system containing a drive shaft (35) connected to the spindle (11), or driven shaft, equipped with two keys (34A and 34B) and a C-shaped spring (33), preloaded and encapsulated in an element of revolution (36), which is limited in rotation and movement by means of a rear cap (25) and a locking washer (23); and d) the electromechanical actuator includes an easy assembly/disassembly system wherein a series of right and left, upper and lower securing elements (44SI, 44SD, 44ID, 44II) are screwed to the inner sleeve (14) with screws (44), adjustment nuts (43) and sealing O-rings (42), through threaded boreholes (14A) in the inner sleeve (14) so as to align with the surfaces (8A) of the recesses of a guide (8), in a predefined position for the replacement of spare parts or an operating position with the surface (44A) of the screws (44) tangential to the inner diameter of the inner sleeve (14) and the adjustment nuts (43), sealing the system.

2. The electromechanical actuator, according to claim 1, wherein the two or more rods (2) include an axial movement stop (Z) of the actuator consisting of a ring machined or welded to the rods (2).

3. The electromechanical actuator, according to claim 1, wherein the load distribution pads (9) are formed by an internally threaded cylindrical tube and a load distribution flange, and fastened to the cap (3) of the outer sleeve (12), restricting the relative movement of all the elements connected thereto.

4. The electromechanical actuator, according to claim 1, wherein the centering piece (16) includes one or more discs (31) or contact surfaces with the inner sleeve (14) rigidly connected to the tubular body (30), the foremost disc having holes in its outer perimeter and the rearmost disc being equipped with an angled chamfer.

5. The electromechanical actuator, according to claim 1, wherein the irreversibility system contains a drive shaft (35) with two plates attached at the ends (35A and 35B), the spindle (11) or driven shaft with two keys (34A and 34B), a C-shaped spring (33), with a preload in a resting state, with two attached triggers (37) at both ends, retained by a locking washer (23) and encapsulated in an element of revolution (36), with axial and rotational restriction by means of the rear cap (25); the C-shaped spring (33) being provided to couple on the drive shaft such that the plates (35A and 35B) come into contact with the triggers (37A and 37B), which in turn are capable of engaging with the keys (34A and 34B) of the driven shaft, so as to enable movement in both directions if movement is initiated on the drive shaft (35) and lock the system if movement is initiated on the driven shaft.

6. The electromechanical actuator, according to claim 1, wherein the element of revolution (36) includes a geometric form (36A) that engages in a relief (25A) of the rear cap (25) determining a restriction means for restricting rotation and axial movement.

7. The electromechanical actuator, according to claim 1, wherein it includes more than one servo motor (40) coupled through a mechanical transmission or mechanical elements in which the input torque to the spindle is the sum of the torques supplied by each servo motor individually.

8. The electromechanical actuator, according to claim 1, wherein the fastening structure (18) for fastening the actuator to the machine includes several flanges (18A, 18B and 18C) for fastening to different parts of the machine and a tubular structure (18D) which is fastened to the sleeve by means of one of the flanges (18C).

9. The electromechanical actuator, according to claim 1, wherein the thrust connector (1) includes a fastening flange (7) for fastening to the flange (6) of a closure casing (5) where the nut (13) is housed, with a guide (8) positioned between both flanges, and the closure casing (5) is closed with a closure cap (10) such that the relative movement between the elements of the assembly is fully restricted.

10. The electromechanical actuator, according to claim 1, wherein the axial bearings (28) of the front housing are contained in individual housings (19) connected by connectors (20), arranged in line in the opposite direction to the pressing movement load (CP), and these in turn are contained in the tubular body (30) of the centering piece (16).

11. The electromechanical actuator, according to claim 1, wherein the axial movement in the direction of load movement in the area of the front housing for the axial bearings (28) is restricted by means of a front closure cap (26) and lock washers (29); the complete housing being kept leak-tight by means of a front seal (46) of the front opening and a rear seal (45) of the rear opening.

12. The electromechanical actuator, according to claim 1, wherein there is a minimum of two axial bearings (28) of the rear housing, the foremost being arranged in the opposite direction to the pressing movement load (CP) and the rearmost arranged in the opposite direction to the retraction movement load (CR) and both housed in the inner rear housing (41) separated by a circular inner rib (38), in turn, the inner rear housing (41) is housed in the tubular body of the outer rear housing (17) equipped with two or more discs (24) or contact surfaces in contact with the inner sleeve (14), the rearmost disc of which is larger in diameter than the rest and having holes in its outer perimeter for fastening to a flange (15) of the inner sleeve (14) and to the rear cap (25).

13. The electromechanical actuator, according to claim 1, wherein each section separated by a circular inner rib (38) from the inner rear housing (41) may contain more than one axial bearing individually contained in individual housings connected in line, those of the front section being in the opposite direction to the pressing movement load (CP) and those of the rear section in the opposite direction to the retraction movement load (CR).

14. The electromechanical actuator, according to claim 1 wherein the outer rear housing is sealed at the front thereof by a front seal (21) and at the rear thereof by the rear cap (25) and a rear seal (22).

* * * * *